United States Patent [19]

Bockrath

[11] 4,289,874

[45] Sep. 15, 1981

[54] AQUEOUS CRYSTALLIZATION OF POLYESTER

[75] Inventor: Ronald E. Bockrath, Aurora, Ill.

[73] Assignee: Standard Oil Company (Indiana), Chicago, Ill.

[21] Appl. No.: 144,212

[22] Filed: Apr 28, 1980

Related U.S. Application Data

[63] Continuation of Ser. No. 923,060, Jul. 10, 1978, abandoned.

[51] Int. Cl.$^3$ .................. C08G 61/00; C08G 61/12; C08J 3/00
[52] U.S. Cl. .................. 528/487; 260/29.2 E; 260/DIG. 35; 525/1; 525/2; 525/3; 525/6; 528/492; 528/494; 528/499; 528/503
[58] Field of Search .................. 260/DIG. 35, 29.2 E; 525/1, 2, 3, 6; 528/487, 492, 494, 499, 503

[56] References Cited

U.S. PATENT DOCUMENTS

| | | | |
|---|---|---|---|
| 2,958,684 | 11/1960 | Kelley et al. | 528/499 |
| 3,014,011 | 12/1961 | Zoetbrood | 260/DIG. 35 |
| 3,390,134 | 6/1968 | Kibler | 260/29.2 E |
| 3,575,931 | 4/1971 | Sherman | 525/1 |
| 3,673,139 | 6/1972 | Hrach | 260/DIG. 35 |
| 4,138,386 | 2/1979 | Motegi et al. | 260/DIG. 35 |

FOREIGN PATENT DOCUMENTS 48-5258  2/1973  Japan ..................... 525/2

OTHER PUBLICATIONS

Schwartz et al., "Surface Active Agents and Detergents", vol. II, 1958, pp. 682–684.

*Primary Examiner*—Allan Lieberman
*Attorney, Agent, or Firm*—William H. Magidson; William T. McClain

[57] ABSTRACT

Aqueous crystallization of polyester, particularly copolymeric polyethylene terephthalate in the presence of surface active agents.

8 Claims, No Drawings

AQUEOUS CRYSTALLIZATION OF POLYESTER

This is a continuation of application Ser. No. 923,060, filed July 10, 1978, now abandoned.

AQUEOUS CRYSTALLIZATION OF POLYESTER

This invention relates to the aqueous crystallization of polyester in the presence of a surface active agent. More particularly, this invention relates to the aqueous crystallization of copolymeric polyethylene terephthalate in the presence of a surface active agent.

Zoetbrood, U.S. Pat. No. 3,014,011 discloses the crystallization of polyester in a liquid prior to drying. The patentee indicates that water is a preferred solvent for the aqueous crystallization because of its low cost. While polyesters, such as homopolymeric polyethylene terephthalate can be crystallized advantageously under such conditions, I have found that copolymeric polyethylene terephthalate cannot be crystallized advantageously in an aqueous medium without agglomeration or sticking of polyester particles. This is apparently due to the fact that the incorporation of additional monomer tends to reduce the second order transition temperature of the polyester with the result that the outer surfaces of the polyester particles tend to stick together. Accordingly, it is desirable to provide a means of aqueous crystallization of polyesters, particularly, polyethylene terephthalate copolyesters in an aqueous bath without agglomeration.

The general object of this invention is to provide an improved method of aqueous crystallization of polyester without agglomeration. More particularly, the object of this invention is to provide a method of aqueous crystallization of copolymeric polyethylene terephthalate.

I have now found that the objects of this invention can be attained by carrying out the aqueous crystallization in the presence of a small concentration of a surface active agent, preferably an anionic surface active agent. Surprisingly the surface active agent tends to prevent agglomeration of the copolymeric particles.

Briefly, this invention comprises the aqueous crystallization of polyester particles, particularly copolymeric polyethylene terephthalate, in a bath containing a small concentration of a surface active agent.

The surface active agents useful in this invention include a wide variety of nonionic and anionic surface active agents. If desired two or more surface active agents can be used. Suitable nonionic surface active agents include alkylphenoxypolyoxyethylene ethanols and alkylpolyoxyethylene ethanols, which are composed of hydrophobic and hydrophillic portions. The hydrophillic portion is a chain of 2 to 120 oxyethylene units while the hydrophobic groups are alkyl groups of 4 to 18 carbon atoms which can be linked to the oxyethylene units through a phenoxy group. Anionic surface active agents include ammonium or alkali metal, etc. (e.g. sodium) salts of alkyl (e.g. lauryl) etc., ether sulfate, ammonium or alkali metal salts of alkylphenoxy polyoxyethylene ethanol sulfate esters (or similar alkyl polyoxyethylene derivatives), salts of N-(1,2 dicarboxyethyl) N-octadecyl sulfosuccinamate (Aerosol 22), alkali metal and ammonium salts of polyelectrolytes, sodium alkyl (e.g. lauryl) sulfate, etc., various detergents, such as Tide, etc. These surface active agents can be used in a concentration of about 0.0001 percent to 5 percent by weight of the aqueous crystallization medium, preferably about 0.01 to 1 percent by weight.

While virtually any water-insoluble crystallizable polyester, such as homopolymeric polyethylene terephthalate, can be utilized in the process of this invention, this invention is primarily useful for the crystallization of copolymeric polyethylene terephthalates. Apparently the presence of additional monomer results in a lower second order transition temperature for the copolymeric polyethylene terephthalate and this apparently influences the tendency of the copolyester to agglomerate during aqueous crystallization. The copolyethylene terephthalate polyester particles particularly useful in this invention have (a) 80 to 100 equivalent percent of the hydroxyl moieties in the polyester provided by ethylene glycol (b) 0 to 1 equivalent percent of the hydroxyl moieties in the polyester provided by polyol having at least 3 hydroxyl groups (c) 0 to 20 equivalent percent of the hydroxyl moieties in the polyester provided by diol other than ethylene glycol (d) 0 to 5 equivalent percent of the hydroxyl moieties in the polyester provided by monohydric alcohol (e) 80 to 100 equivalent percent of the carboxyl moieties in the polyester provided by terephthalic acid compound (f) 0 to 1 equivalent percent of the carboxyl moieties in the polyester provided by polycarboxylic acid compound having at least three carboxyl groups (g) 0 to 20 equivalent percent of the carboxyl moieties in the polyester provided by dicarboxylic acid compound other than terephthalic acid (h) 0 to 5 equivalent percent of the carboxyl groups in the polyester provided by monocarboxylic acid (j) 0 to 1 equivalent percent of the total hydroxyl and carboxyl moieties in the polyester provided by a hydroxy carboxylic acid having a total of at least 3 hydroxyl and carboxyl groups with the proviso that (a) and (e) are not both 100 percent and when (b), (f) and (j) are each 0 then at least one of (c) and (g) are at least 2 equivalent percent.

The preferred copolymeric polyethylene terephthalate of this invention contains a small concentration of a branching agent [component (b), (f) or (j)] and from about 3 to 10 equivalent percent of a second difunctional monomer of the type recited in group (c) and/or group (g).

Suitable polyols having at least 3 hydroxy groups include 1,1,1-trimethylol ethane, 1,1,1-trimethylol propane, pentaerythritol, 1,2,6-hexanetriol, etc. Suitable polycarboxylic acids having at least 3 carboxyl groups include a trimellitic acid compound (acid or anhydride), pyromellitic anhydride, butane tricarboxylic acid, butane-1,2,3,4,-tricarboxylic acid, etc. Suitable hydroxy carboxylic acids having at least 3 hydroxy and carboxy groups (a functionality of at least 3) include dimethylolpropionic acid. Generally, these branching agents are used in a concentration of about 0.001 to 0.25 equivalent percent of the respective hydroxyl or carboxyl moieties in the polyester. As the concentration of branching agent increases, there is a tendency for partial gelation of a small concentration of the polyester. This is sometimes manifested in asperities in films produced from the polyester. These asperities can be eliminated by balancing the branching agent in the polyester with a small concentration of a monofunctional material. For example, when a polyol branching agent is employed it can be desirable to add a small concentration of a monohydric alcohol, such as methanol, ethanol, butanol, octanol, etc. On the other hand, when a branching agent containing at least 3 carboxyl groups is employed, it can be desirable to balance the carboxyl functionality with a monocarboxylic acid, such as acetic acid, propionic acid, benzoic acid, toluic acid, etc. This technique of balancing the monofunctional and polyfunctional branching agents is discussed in somewhat greater detail in Def. Pub. No. T954,005 of Davis published Jan. 4, 1977, which is incorporated hereby by reference.

Suitable dicarboxylic acids useful in this invention include isophthalic acid, naphthalene-2,6-dicarboxylic acid, etc. Suitable diols useful in this invention include alkylene glycols containing from 3 to 12 carbon atoms in the alkylene group such as propylene glycol, butylene glycol, hexylene glycol, dodecylene glycol, etc.; 1,4-cyclohexane dimethanol, etc.

The polyesters useful in this invention can be prepared by polymerizing the appropriate monomers under conventional conditions using conventional catalysts to an I.V. (inherent viscosity) of about 0.2 to 0.9 dl/g (determined in 60:40 phenol:tetrachloroethane at 30° C. and 0.4 g/dl). The polyester can be converted into particulate form, such as filaments, ribbons or rods or subdivided by flaking or chopping as is conventional in this art. Best results have been obtained with pellets having a diameter of 0.5 mm to 2.0 mm and 0.5 mm to 4 mm length.

In somewhat greater detail, the polyester particles and surface active agent are added to an aqueous bath. The polyester particles can comprise from 5 to 60 percent by weight of the aqueous bath. The composition can be maintained at about 50° to 150° C. with agitation until the polyester reaches the desired crystallinity usually evidenced by the polyester turning opaque. Preferably the temperature is maintained at about 75° to 100° C. in order to avoid the use of pressure vessels. The residence time can range from a few minutes to six hours depending on the temperature with the minimum time period being inverse to the temperature. As is well known, the maximum crystallinity attainable is temperature dependent. The crystallized polyester can then be dewatered and usually solid state polymerized.

EXAMPLE I

One-hundred grams of a polyester prepared from a composition comprising 38 parts by weight ethylene glycol, 59 parts by weight terephthalic acid, 3.1 parts by weight isophthalic acid and 0.11 parts by weight trimellitic anhydride having an inherent viscosity of 0.4 dl/g in the form of amorphous micropellets of 1 mm diameter by 2 mm length was added to 2 liters of 95° C. water in a 4-liter beaker equipped with a 1½" magnetic stirring bar on a hot plate set at medium stirring rate. After thirty seconds the copolyester agglomerated into a single sponge-like mass.

When this example was repeated except that 1 gram of Tide was added to the water, no agglomeration occurred and the pellets remained free flowing and turned opaque after heating for 15 minutes indicating crystallization of the polyester.

The polyester utilized in this example was prepared as follows:

Terephthalic Acid 475 lbs, Isophthalic Acid 25 lbs, Ethylene Glycol 305 lbs, Trimellitic Anhydride 393.5 gms, Disopropylamine 500 ml and Antimony Triacetate 80.8 gms were charged into a 200-gal Pfaudler kettle. Air was removed via vacuum and replaced with nitrogen three times. The reaction mass was held overnight with stirring. The material was heated with stirring to 460° F. during 1 hour, at which time 100 psig pressure was obtained. The 100 psig was maintained by bleeding off and condensing the esterification byproducts, while the material was further heated to 503° F. During this 2 hours, 132 lbs of condensate was collected. The temperature was further increased to 539° F. over the next 1.5 hours, while the pressure was reduced to 0 psig. The total condensate collected was 189.5 lbs. A vacuum was applied and polycondensation continued for 2 hours. The product was discharged in a hot melt chopper and water quenched. The material was subsequently crystallized in a Littleford Dryer and agglomerated material was broken up mechanically and screened. The material was dried overnight at 300° F. and extruded and pelletized with an Automatik UWG pelletizer into 1.0 mm diameter by 1.5 mm long amorphous pellets.

EXAMPLE II

Example I was repeated with essentially the same results when Tide was replaced with polyoxyethylene sorbitan monooleate (Polysorbate 80, Tween 80, 100% liquid).

EXAMPLE III

Example I was repeated with essentially the same results when Tide was replaced with dodecyl sodium sulfate.

EXAMPLE IV

Example I was repeated with essentially the same results when Tide was replaced with octylphenoxy polyethoxy ethanol (Triton X-100, 100% liquid).

I claim:

1. A process of increasing crystallinity of water-insoluble crystallizable polyester pellets in an aqueous medium which comprises crystallizing polyester pellets having a diameter of 0.5 mm to 2.0 mm and 0.5 mm to 4 mm in length in an aqueous medium at about 50°-150° C. containing 0.0001 to 5% by weight of at least one surface active agent capable of preventing agglomeration of said polyester pellets selected from the group consisting of nonionic surface active agents and anionic surface active agents and dewatering said polyester pellets, wherein said polyester pellets comprise from 5-60% by weight of the aqueous bath.

2. The process of claim 1, wherein said polyester is homopolymeric polyethylene terephthalate.

3. The process of claim 1 wherein said polyester has
   (a) 80 to 100 equivalent percent of the hydroxyl moieties in the polyester provided by ethylene glycol
   (b) 0 to 1 equivalent percent of the hydroxyl moieties in the polyester provided by polyol having at least 3 hydroxyl groups
   (c) 0 to 20 equivalent percent of the hydroxyl moieties in the polyester provided by diol other than ethylene glycol
   (d) 0 to 5 equivalent percent of the hydroxyl moieties in the polyester provided by monohydric alcohol
   (e) 80 to 100 equivalent percent of the carboxyl moieties in the polyester provided by terephthalic acid compound
   (f) 0 to 1 equivalent percent of the carboxyl moieties in the polyester provided by polycarboxylic acid compound having at least three carboxyl groups (g) 0 to 20 equivalent percent of the carboxyl moieties in the polyester provided by dicarboxylic acid compound other than terephthalic acid (h) 0 to 5 equivalent percent of the carboxyl groups in the polyester provided by monocarboxylic acid (j) 0 to 1 equivalent percent of the total hydroxyl and carboxyl moieties in the polyester provided by a hydroxy carboxylic acid having a total of at least 3 hydroxyl and carboxyl groups with the proviso that (a) and (e) are not both 100 percent and when (b), (f) and (j) are each 0, at least one of (c) and (g) are at least 2 equivalent percent.

4. The process of claim 3, wherein said surface active agent comprises an anionic surface active agent.

5. The process of claim 4, wherein said anionic surface active agent comprises dodecyl sodium sulfate.

6. The process of claim 3, wherein said surface active agent comprises a nonionic surface active agent.

7. The process of claim 6, wherein said nonionic surface active agent comprises polyoxyethylene sorbitan monooleate.

8. The process of claim 6, wherein said nonionic surface active agent comprises octylphenoxy polyethoxy ethanol.

* * * * *